United States Patent
Rook

(10) Patent No.: US 9,950,786 B2
(45) Date of Patent: Apr. 24, 2018

(54) AIRCRAFT AXLE INSERT TO MITIGATE VIBRATION

(71) Applicant: Goodrich Corporation, Charlotte, NC (US)

(72) Inventor: Todd Rook, Tipp City, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 98 days.

(21) Appl. No.: 14/977,153

(22) Filed: Dec. 21, 2015

(65) Prior Publication Data

US 2017/0174333 A1   Jun. 22, 2017

(51) Int. Cl.
  *B64C 25/58*   (2006.01)
  *B64C 25/36*   (2006.01)
  *B60B 35/08*   (2006.01)
  *F16F 15/14*   (2006.01)

(52) U.S. Cl.
  CPC .............. *B64C 25/58* (2013.01); *B60B 35/08* (2013.01); *B64C 25/36* (2013.01); *F16F 15/14* (2013.01); *B60B 2900/131* (2013.01); *Y10T 464/50* (2015.01)

(58) Field of Classification Search
  CPC ......... B60B 35/02; B60B 35/08; B64C 25/36; B64C 25/42; B64C 25/58; F16C 13/02; F16C 3/023; B60K 17/22; F16F 15/02; F16F 15/12; F16F 15/14; F16F 15/145; F16F 15/322; F16F 15/1407; F16F 7/10; Y10T 464/50
  USPC ................................................ 464/180, 183
  See application file for complete search history.

(56) References Cited

U.S. PATENT DOCUMENTS

| | | | | |
|---|---|---|---|---|
| 2,948,129 A | * | 8/1960 | Troyer | F16D 3/76 29/450 |
| 5,259,818 A | | 11/1993 | Kachi | |
| 5,303,985 A | * | 4/1994 | Barnholt | B60B 35/006 301/124.1 |
| 5,855,416 A | * | 1/1999 | Tasker | B60B 35/166 188/18 A |

(Continued)

FOREIGN PATENT DOCUMENTS

| | | |
|---|---|---|
| DE | 3632418 | 3/1988 |
| GB | 404153 | 1/1934 |
| GB | 1462170 | 1/1977 |

OTHER PUBLICATIONS

Extended European Search Report dated May 26, 2017 in European Application No. 16204265.9.

*Primary Examiner* — Kip T Kotter
(74) *Attorney, Agent, or Firm* — Snell & Wilmer L.L.P.

(57) ABSTRACT

Systems and methods are disclosed for aircraft wheels and brakes systems for use in, for example, an aircraft. In this regard, a damper for an axle may comprise a solid body defined by a cylindrical outside diameter (OD) surface and an elliptical inner surface configured to be inserted into a bore of the axle, the elliptical inner surface defining a void. The damper may comprise a varying thickness between the OD surface and the elliptical inner surface, the varying thickness including a minimum thickness along a major axis of the inner surface and a maximum thickness along a minor axis of the inner surface. The varying thickness may help to decouple a bending mode along the minor axis from the bending mode along the major axis.

19 Claims, 3 Drawing Sheets

(56) References Cited

U.S. PATENT DOCUMENTS

| | | | |
|---|---|---|---|
| 5,915,503 A * | 6/1999 | Enright | F16D 55/36 |
| | | | 188/130 |
| 6,312,340 B1 | 11/2001 | Gassen | |
| 6,409,606 B1 * | 6/2002 | Nakajima | B29C 70/088 |
| | | | 138/114 |
| 6,439,359 B1 * | 8/2002 | Kato | B60G 13/16 |
| | | | 188/379 |
| 6,752,248 B2 | 6/2004 | Berwanger | |
| 7,124,860 B2 | 10/2006 | Souetre | |
| 7,671,812 B1 | 3/2010 | Yasin | |
| 8,616,345 B2 | 12/2013 | Rook | |
| 2002/0117228 A1 * | 8/2002 | Nakajima | F16C 3/026 |
| | | | 138/153 |
| 2005/0159229 A1 * | 7/2005 | Lee | F16C 3/026 |
| | | | 464/181 |
| 2007/0072688 A1 * | 3/2007 | Dickson | F16C 3/02 |
| | | | 464/180 |
| 2007/0117640 A1 | 5/2007 | Haka | |
| 2007/0271790 A1 * | 11/2007 | Bingham | B64C 25/36 |
| | | | 29/894 |
| 2014/0139012 A1 * | 5/2014 | Dziekonski | B60B 35/00 |
| | | | 301/124.1 |
| 2017/0167568 A1 * | 6/2017 | Cho | F16F 15/1407 |

* cited by examiner

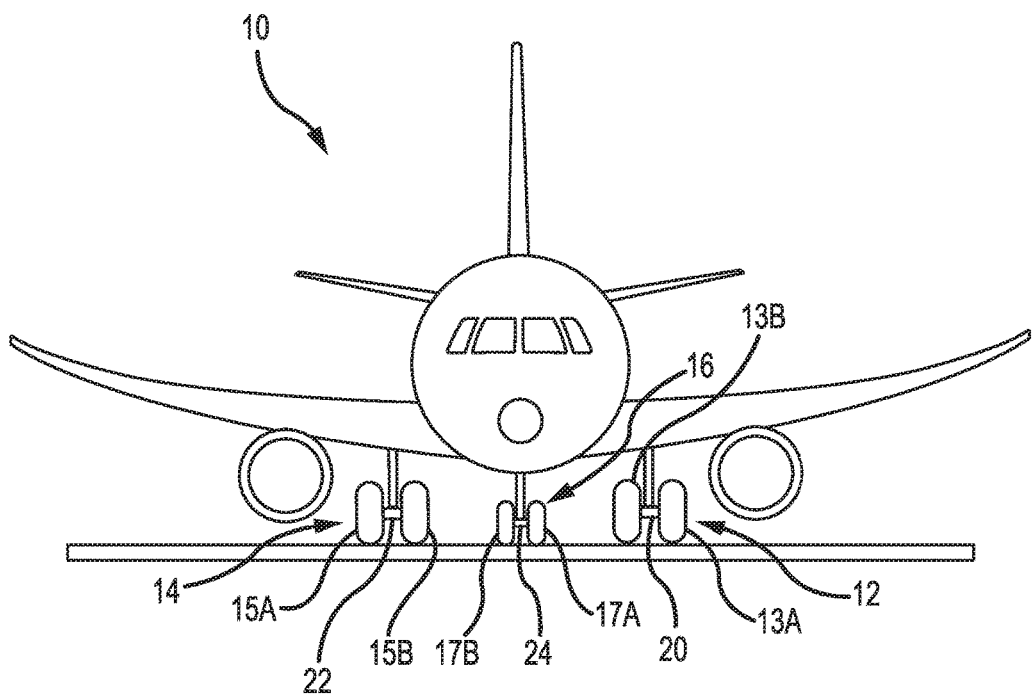
FIG.1
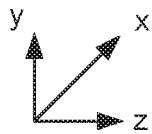

AIRCRAFT AXLE INSERT TO MITIGATE VIBRATION

FIELD

The present disclosure relates generally to the field of vibration damping, and more specifically to systems and methods for axle vibration damping.

BACKGROUND

Conventional aircraft wheel and brake assemblies comprise rotating and stationary components. During braking, vibration of a wheel and brake assembly, including an axle assembly, may occur. Such vibration may be influenced according to vertical and lateral bending modes of an axle assembly. Axle and brake vibration can result in damaged aircraft components if not properly managed.

SUMMARY

Systems and methods disclosed herein may be useful for use in vibration prevention of aircraft wheels and brakes systems. In this regard, a damper for an axle may comprise a solid body defined by a cylindrical outside diameter (OD) surface and an elliptical inner surface configured to be inserted into a bore of the axle, the elliptical inner surface defining a void.

In various embodiments, the damper may be configured to be press fit into the bore of the axle. The solid body may comprise at least one of a metal alloy or a carbon/carbon composite. The outside diameter (OD) surface of the damper may be configured to be radially retained by an inside diameter (ID) surface of the axle. The damper may comprise a varying thickness including a minimum thickness along a major axis of the inner surface and a maximum thickness along a minor axis of the inner surface, the maximum thickness being greater than the minimum thickness. The varying thickness may be configured to decouple a bending mode along the minor axis from the bending mode along the major axis.

An axle assembly may comprise an axle and a damper located inside of a bore of the axle comprising a solid body defined by a cylindrical outside diameter (OD) surface and an elliptical inner surface, the inner surface defining a void.

In various embodiments, the axle assembly may further comprise at least one of a wheel axle sleeve or a brake axle sleeve circumferentially surrounding the axle. The axle assembly may further comprise an axle nut coupled to the axle, the axle nut configured to axially retain a wheel to the axle. The axle nut may be configured to axially retain the damper. The damper may be configured to be press fit into the bore of the axle. The solid body may comprise at least one of a metal alloy or a carbon/carbon composite. The outside diameter (OD) surface of the damper may be configured to be radially retained by an inside diameter (ID) surface of the axle. The damper may comprise a varying thickness including a minimum thickness along a major axis of the inner surface and a maximum thickness along a minor axis of the inner surface, the maximum thickness being greater than the minimum thickness. The varying thickness may be configured to decouple a bending mode along the minor axis from the bending mode along the major axis.

A damper for an axle may comprise a solid body defined by a cylindrical outside diameter (OD) surface and an inner surface, the inner surface defining a void, the damper configured to be inserted into a bore of the axle and the OD surface configured to be radially retained by an inside diameter (ID) surface of the axle, wherein a section modulus of the solid body is greater in a first direction than in a second direction, the first direction and the second direction being perpendicular to a centerline axis of the damper.

In various embodiments, a length of the damper may be between 100% and 1000% of a diameter of the damper. A length of the damper may be between 10% and 50% of a length of the axle. A length of a minor axis of the inner surface may be between 20% and 75% of a length of a major axis of the inner surface. The length of the minor axis of the inner surface may be between 20% and 50% of the length of the major axis of the inner surface.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

Various embodiments are particularly pointed out and distinctly claimed in the concluding portion of the specification. Below is a summary of the drawing figures, wherein like numerals denote like elements and wherein:

FIG. 1 illustrates an aircraft having landing gear, in accordance with various embodiments;

DETAILED DESCRIPTION

Figure 2:
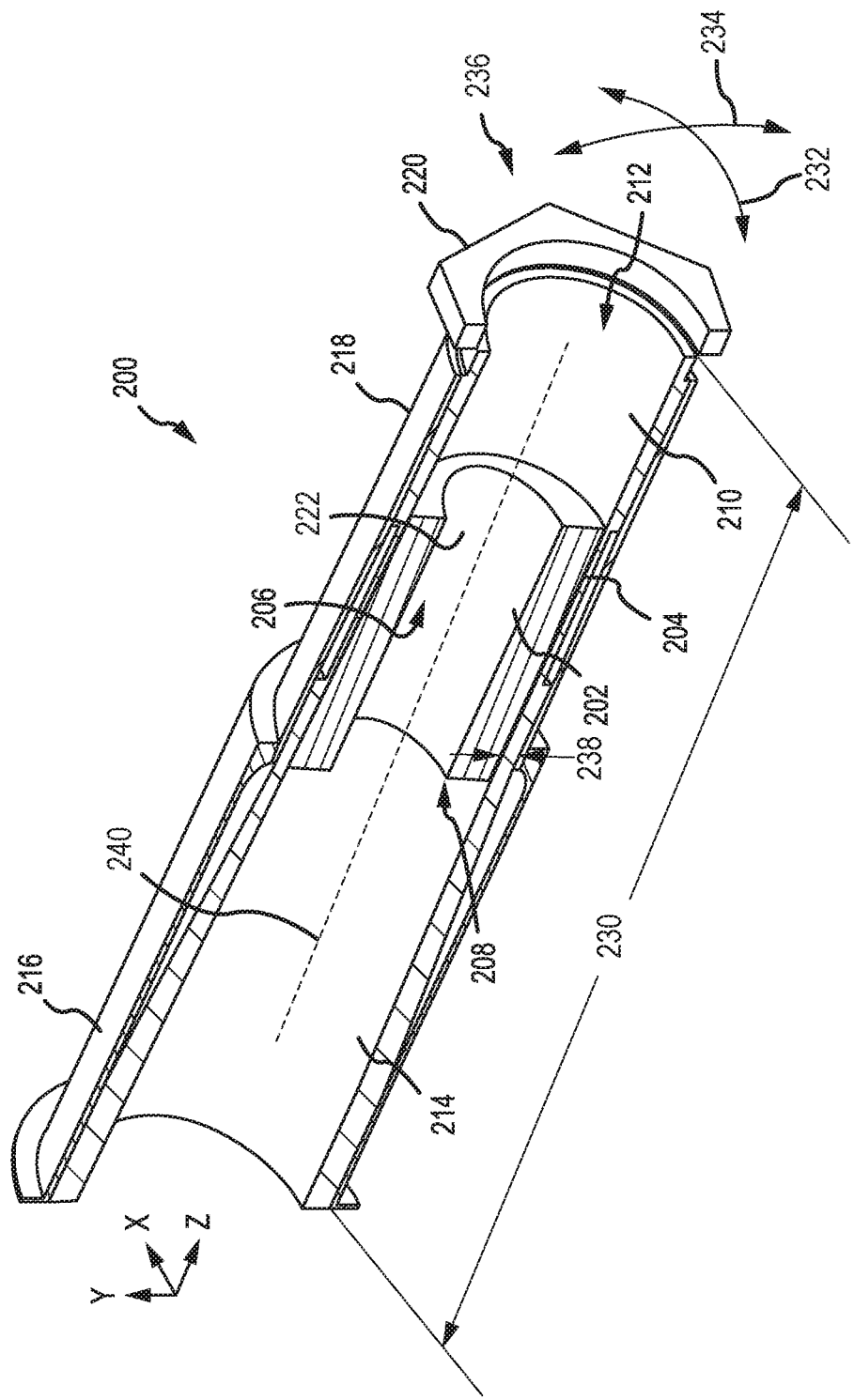
FIG. 2 illustrates a partial cross-section view of an aircraft axle assembly with a damper, in accordance with various embodiments.

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Moreover, many of the functions or steps may be outsourced to or performed by one or more third parties. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

In the context of the present disclosure, methods may find particular use in connection with aircraft wheel and brake systems. However, various aspects of the disclosed embodiments may be adapted for optimized performance with a variety of components and in a variety of systems. As such, numerous applications of the present disclosure may be realized.

In various embodiments, a damper may comprise a solid body defined by a cylindrical outer diameter (OD) surface and an elliptical inner surface. Thus, the damper may comprise a varying thickness around its circumference and therefore have mass unevenly distributed around its circumference. The damper may be inserted into an axle to help mitigate harmonic vibration of the axle, axle assembly, and adjacent components such as the wheel and brake assembly, for example. The varying thickness, and thus varying distribution of mass, may be configured to decouple a bending mode along a major axis of the damper from a bending mode along a minor axis of the damper, thus, decoupling such bending modes of the axle assembly. Accordingly, the damper may mitigate or prevent rotor-dynamic vibration such as forward whirl modes and backward whirl modes. Whirl mode may be a form of vibrating motion inherent rotating machinery which may disturb the rotating machinery from smooth rotation. Stated another way, whirl vibration may cause out-of-plane wobble of rotating machinery, such as an axle for example. In regards to brake assemblies, whirl can generally be detected by actuator pressure oscillations.

With reference to FIG. 1, an aircraft 10 in accordance with various embodiments may include landing gear such as landing gear 12, landing gear 14 and landing gear 16. Landing gear 12, landing gear 14 and landing gear 16 may generally support aircraft 10 when aircraft is not flying, allowing aircraft 10 to taxi, take off and land without damage. Landing gear 12 may include wheel 13A and wheel 13B coupled by an axle 20. Landing gear 14 may include wheel 15A and wheel 15B coupled by an axle 22. Landing gear 16 may include nose wheel 17A and nose wheel 17B coupled by an axle 24. The nose wheels differ from the main wheels in that the nose wheels may not include a brake and/or a wheel speed transducer. An xyz axes is used throughout the drawings to illustrate the axial (z), radial (y) and circumferential (x) directions relative to wheel 15A.

With reference to FIG. 2, a partial cross-section view of axle assembly 200 is illustrated. In various embodiments, axle assembly 200 may include axle 210, damper 202, first sleeve (also referred to herein as a brake axle sleeve) 216, second sleeve (also referred to herein as wheel axle sleeve) 218, and/or nut (also referred to herein as axle nut) 220. In various embodiments, axle 210 may be similar to axle 22 (see FIG. 1). Brake axle sleeve 216 may circumferentially surround at least a portion of axle 210. Brake axle sleeve 216 may be configured to be coupled to a brake system. Wheel axle sleeve 218 may circumferentially surround at least a portion of axle 210. Wheel axle sleeve 218 may be configured to be coupled to a wheel. In various embodiments, axle nut 220 may be coupled to axle 210. In various embodiments, axle nut 220 may axially (z-direction) retain wheel axle sleeve 218. In various embodiments, axle nut 220 may axially (z-direction) retain damper 202. In various embodiments, axle nut 220 may axially (z-direction) retain a wheel, such as wheel 15B (see FIG. 1) for example, coupled to axle 210. Axle 210 may be configured to rotate about a center axis with a wheel, such as wheel 15B (see FIG. 1) for example.

Axle 210 may comprise a bore 212. Damper 202 may be located inside of bore 212. Axle 210 may comprise an inside diameter (ID) surface 214. Damper 202 may comprise an outside diameter (OD) surface 204. OD surface 204 may be radially retained by ID surface 214. In various embodiments, damper 202 may be press-fit into axle 210.

Damper 202 may comprise a solid body 208 defined by OD surface 204 and inner surface 222. Inner surface 222 may define a void 206. OD surface 204 may comprise a cylindrical geometry. Inner surface 222 may comprise an elliptical geometry. In various embodiments, inner surface 222 may comprise a surface which is not a surface of revolution with respect to the centerline of axle 210. Accordingly, inner surface 222 may comprise a rectangular, trapezoidal, or any other geometry. Accordingly, the section modulus of damper 202 may be different in the x-direction than in the y-direction. Stated another way, the section modulus of damper 202 may be different in a first direction (x-direction) than in a second direction (y-direction), the first direction and the second direction being perpendicular to centerline axis 240 of the damper.

In various embodiments, axle assembly 200 may comprise one or more bending modes. Such bending modes may be manifested in response to axle assembly 200 rotating about a center axis. Generally the bending mode of a cylindrical member is symmetric about a center axis because of the symmetry of cylindrical members about a center axis. In that regard, axle assembly 200 may comprise a first bending mode along the x-direction illustrated by arrow 232 and a second bending mode along the y-direction illustrated by arrow 234. In that regard, first bending mode 232 may correspond to the vibration of the distal end 236 of axle 210 along the y-axis. Furthermore, second bending mode 234 may correspond to the vibration of the distal end 236 of axle 210 along the x-axis. Without damper 202, first bending mode 232 and second bending mode 234 may be more or less equal. However, by inserting damper 202 into bore 212 of axle 210, first bending mode 232 and second bending mode 234 may be decoupled. Stated another way, first bending mode 232 and second bending mode 234 may not be equal in response to damper 202 being inserted into axle 210. Thus, providing a damper having a geometry which is not symmetric about a center axis may decouple bending modes in different directions. Such decoupling may prevent various modes of vibration, such as whirl modes for example.

Figure 3:
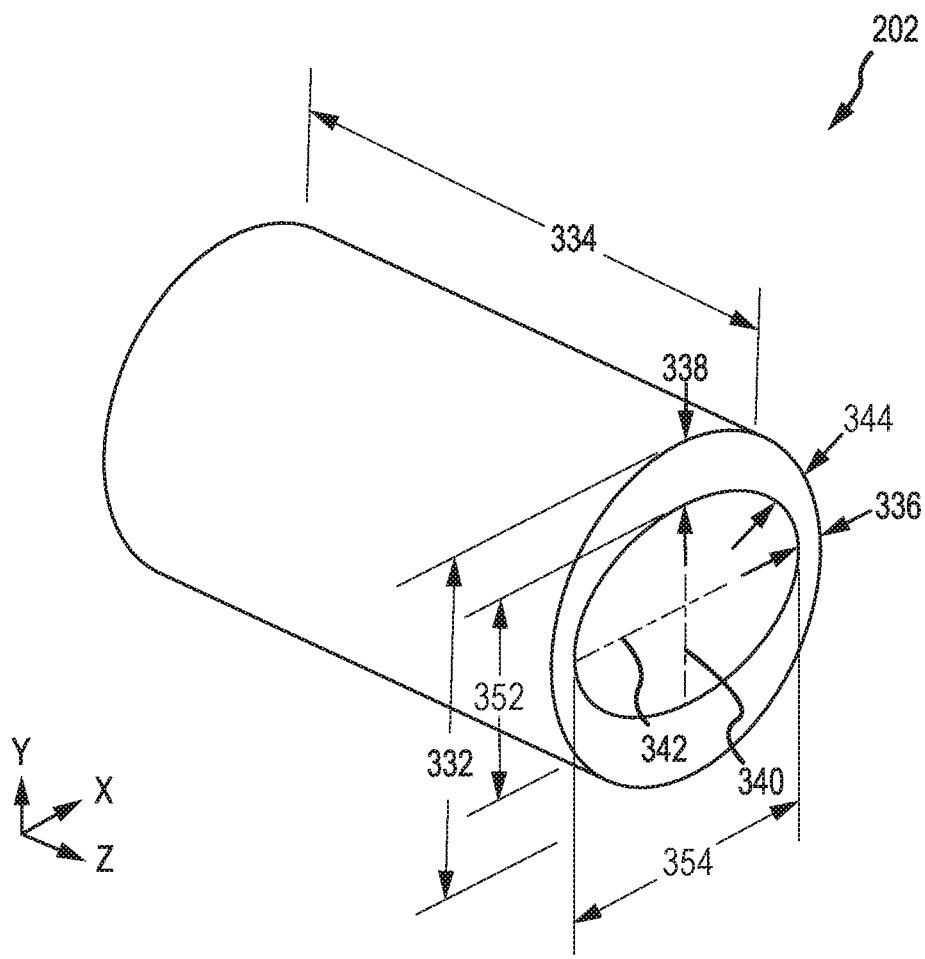
FIG. 3 illustrates a perspective view of a damper with an inner surface having a major axis and a minor axis, in accordance with various embodiments.

With reference to FIG. 2 and FIG. 3, inner surface 222 may comprise a major axis 342 and a minor axis 340. In various embodiments, damper 202 may comprise a varying thickness 344. Varying thickness 344 may vary along the circumference of damper 202. In various embodiments, varying thickness 344 may include a minimum thickness 336 along major axis 342. In various embodiments, varying thickness 344 may include a maximum thickness 338 along minor axis 340. Accordingly, due to varying thickness 344, the mass of damper 202 may vary along the circumference of damper 202. Accordingly, damper 202 may reduce the vibration of axle 210. Damper 202 may reduce or mitigate harmonic vibration of axle 210.

With reference to FIG. 3, damper 202 is illustrated. An xyz-axes is provided for ease of illustration. In various embodiments, damper 202 may comprise a high temperature metal alloy, carbon/carbon composite, ceramic composite, or any other suitable high temperature material. Damper 202 may comprise a length 334 and a diameter 332. In various embodiments, length 334 may be between 100% and 1000% of diameter 332. In various embodiments, length 334 may be between 200% and 800% of diameter 332. In various embodiments, length 334 may be between 300% and 500% of diameter 332.

With reference to FIG. 2 and FIG. 3, in various embodiments, axle 210 may comprise a length 230 measured along an axial direction (z-direction). In various embodiments, length 334 may be between 2% and 50% of length 230. In various embodiments, length 334 may be between 5% and 25% of length 230. In various embodiments, length 334 may be between 10% and 20% of length 230.

Axle 210 may comprise a thickness 238. In various embodiments, minimum thickness 336 may be between 0.1% and 100% of thickness 238. In various embodiments, minimum thickness 336 may be between 1% and 50% of thickness 238. In various embodiments, minimum thickness 336 may be between 5% and 25% of thickness 238.

In various embodiments, maximum thickness 338 may be between 1% and 800% of thickness 238. In various embodiments, maximum thickness 338 may be between 50% and 500% of thickness 238. In various embodiments, maximum thickness 338 may be between 200% and 400% of thickness 238.

Minor axis 340 may comprise a length 352. Major axis 342 may comprise a length 354. In various embodiments, length 352 may be between 10% and 80% of length 354. In various embodiments, length 352 may be between 20% and 75% of length 354. In various embodiments, length 352 may be between 20% and 50% of length 354.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments. Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A damper for an axle comprising:
   a solid body defined by a cylindrical outside diameter (OD) surface and an elliptical inner surface configured to be inserted into a bore of the axle, the elliptical inner surface defining a void concentric with the damper, the elliptical inner surface comprising a major axis and a minor axis, wherein a first length of the major axis is greater than a second length of the minor axis, wherein the damper is configured to rotate with the axle about a center axis.

2. The damper for an axle of claim 1, wherein the damper is configured to be press fit into the bore of the axle.

3. The damper for an axle of claim 1, wherein the solid body comprises at least one of a metal alloy or a carbon/carbon composite.

4. The damper for an axle of claim 1, wherein the outside diameter (OD) surface of the damper is configured to be radially retained by an inside diameter (ID) surface of the axle.

5. The damper for an axle of claim 1, wherein the damper comprises a varying thickness including a minimum thickness along the major axis of the inner surface and a maximum thickness along the minor axis of the inner surface, the maximum thickness being greater than the minimum thickness.

6. The damper for an axle of claim 5, wherein the varying thickness is configured to decouple a bending mode along the minor axis from the bending mode along the major axis.

7. An axle assembly comprising:
   a rotatable axle; and
   a damper located inside of a bore of the axle comprising a solid body defined by a cylindrical outside diameter (OD) surface and an elliptical inner surface, the elliptical inner surface defining a void concentric with the damper, the elliptical inner surface comprising a major axis and a minor axis, wherein a first length of the major axis is greater than a second length of the minor axis.

8. The axle assembly of claim 7, further comprising at least one of a wheel axle sleeve or a brake axle sleeve circumferentially surrounding the axle.

9. The axle of claim 7, further comprising an axle nut coupled to the axle.

10. The axle assembly of claim 7, wherein the damper is configured to be press fit into the bore of the axle.

11. The axle assembly of claim 7, wherein the solid body comprises at least one of a metal alloy or a carbon/carbon composite.

12. The axle assembly of claim 7, wherein the outside diameter (OD) surface of the damper is configured to be radially retained by an inside diameter (ID) surface of the axle.

13. The axle assembly of claim 7, wherein the damper comprises a varying thickness including a minimum thickness along the major axis of the elliptical inner surface and a maximum thickness along the minor axis of the elliptical inner surface, the maximum thickness being greater than the minimum thickness.

14. The axle assembly of claim 13, wherein the varying thickness is configured to decouple a bending mode along the minor axis from the bending mode along the major axis.

15. A damper for an axle comprising:

a solid body defined by a cylindrical outside diameter (OD) surface and an inner surface, the inner surface defining a void concentric with the damper, the damper configured to be inserted into a bore of the axle and the OD surface configured to be radially retained by an inside diameter (ID) surface of the axle, wherein a section modulus of the solid body is greater in a first direction than in a second direction, the first direction and the second direction being perpendicular to a centerline axis of the damper, wherein the damper is configured to rotate with the axle about a center axis.

16. The damper for the axle of claim 15, wherein a length of the damper is between 100% and 1000% of a diameter of the damper.

17. The damper for the axle of claim 15, wherein a length of the damper is between 10% and 50% of a length of the axle.

18. The damper for the axle of claim 15, wherein a first length of a minor axis of the inner surface is between 20% and 75% of a second length of a major axis of the inner surface.

19. The damper for the axle of claim 18, wherein the first length of the minor axis of the inner surface is between 20% and 50% of the second length of the major axis of the inner surface.

* * * * *